United States Patent [19]

Dietrich et al.

[11] Patent Number: 4,735,729
[45] Date of Patent: Apr. 5, 1988

[54] ASH CONCENTRATION AND DISPOSAL METHOD

[75] Inventors: Marvin J. Dietrich, Schofield; Mark C. Hoffman, Mosinee; Thomas P. Oettinger, Schofield, all of Wis.

[73] Assignee: Zimpro Inc., Rothschild, Wis.

[21] Appl. No.: 876,389

[22] Filed: Jun. 20, 1986

[51] Int. Cl.$^4$ .............................................. C02F 11/18
[52] U.S. Cl. ..................... 210/712; 210/768; 210/804; 210/805; 210/919
[58] Field of Search .............. 210/714, 717, 670, 673, 210/712, 713, 761, 768, 800, 804, 805, 919, 769

[56] References Cited

U.S. PATENT DOCUMENTS

| | | | |
|---|---|---|---|
| 3,226,319 | 12/1965 | Schick | 210/714 |
| 3,388,060 | 6/1968 | Clark | 210/714 |
| 3,876,537 | 4/1975 | Dulin et al. | 210/717 X |
| 3,887,461 | 6/1975 | Nickerson et al. | 210/769 X |
| 3,904,518 | 9/1975 | Hutton et al. | 210/11 |
| 3,933,634 | 1/1976 | Seki | 210/714 X |
| 3,977,966 | 8/1976 | Prodt et al. | 210/761 X |
| 3,984,312 | 10/1976 | Dulin et al. | 210/717 X |
| 4,069,148 | 1/1978 | Hutton et al. | 210/11 |
| 4,071,391 | 4/1977 | Black | 210/713 X |
| 4,224,148 | 9/1980 | Lindman et al. | 210/714 |

Primary Examiner—Tom Wyse
Attorney, Agent, or Firm—Michael, Best & Friedrich

[57] ABSTRACT

Suspended ash in wastewater is efficiently concentrated and removed by mixing the ash suspension with thermally conditioned sludge. The solids in the resulting ash/sludge mixture are easily settled and dewatered by conventional means.

21 Claims, 1 Drawing Sheet

ASH CONCENTRATION AND DISPOSAL METHOD

BACKGROUND OF THE INVENTION

1. Field of the Invention

The present invention is concerned with a process for the removal of suspended ash from wastewater and the ultimate disposal of the ash.

2. Information Disclosure Statement

Powdered adsorptive materials, such as activated carbon, coke fines, diatomaceous earth, fly ash, etc., are used in wastewater treatment in a variety of ways. Addition of such material to a biological treatment system often provides enhanced treatment performance. The biological system may be aerobic, anoxic or anaerobic in nature. The most commonly used adsorbent material is powdered activated carbon and when carbon is mixed with biological solids in an aeration basin, constitutes the Powdered Activated Carbon Treatment (PACT[198]) process, examples of such process are described in U.S. Pat. Nos. 3,904,518 and 4,069,148. It is generally economical to regenerate the powdered carbon once its adsorptive properties are expended and to reuse the regenerate carbon in the treatment process. An efficient method of carbon regeneration is wet air oxidation of the mixture of biological solids and spent carbon. Wet air oxidation at temperatures of 400° to 550° F. (204° to 288° C.) and pressures of 350 psig to 1900 psig (2413 to 13,100 KPa) destroys the volatile portion of the biological solids and oxidizes the organic substances adsorbed on the surface of the powdered carbon restoring adsorptive capacity. The resulting regenerated carbon is recycled to the treatment process.

The above described carbon regeneration/biomass destruction is distinguished from the wet air oxidation of primary sludge, activated sludge, or mixtures thereof, at lower temperatures of 300° to 398° F. (150°-200° C.) and pressures of 100 to 300 psig (700 to 2070 KPa) which is termed thermal conditioning of sludges. See W. B. Gitchel U.S. Pat. Nos. 3,272,740 and 3,359,200. The purpose of thermal conditioning is to render the sludge more easily dewaterable prior to final disposal.

An alternative method of carbon regeneration and biological solids disposal is controlled flame incineration operating under limited oxygen conditions. This thermal regeneration is generally carried out under a controlled atmosphere such as in a multiple hearth furnace. The hot thermally regenerated carbon and biomass residue mixture is cooled by introduction into a water quench tank. The resulting aqueous slurry or regenerated carbon is recycled to the treatment process.

The ash content of the regenerated carbon stream from either regeneration method can increase due to inorganic contaminants removed from the wastewater by the carbon and from the residue of the oxidized biological solids. Virgin powdered activated carbon also contains varying amounts of ash (5-35%) and oxidation of small fractions of the carbon during successive regenerations can result in an increase in the proportion of ash to carbon. The recovered aqueous slurry from either regeneration method consists primarily of reactivated carbon particles and inorganic ash particles. The continued recycle of this inorganic material to the treatment process along with the recovered carbon eventually leads to an undesirable increase in the ash content of the wastewater treatment system. Thus there is a need to remove a portion of the ash from the regenerated carbon stream to prevent a buildup of inert solids which could be detrimental to operation of the treatment process.

Armold et al. U.S. Pat. No. 4,541,933 discloses the separation of ash from a mixture of carbon, ash and supernatant which results from wet oxidation of waste activated sludge/powdered carbon mixtures. The method uses a plurality of hydrocyclones to concentrate the ash followed by collection of the ash concentrate on a screen.

Japanese patent disclosure No. 96713/81 reports the separation of ash from wet air regenerated carbon by diluting the regenerated carbon/ash mixture with water, or with water and a dispersing agent to hold the ash in suspension while the carbon particles settle. The settled carbon fraction is recycled to the treatment process while the ash particles contained in the dispersed ash slurry are subsequently concentrated by addition of cationic flocculent (1-2 ppm), dewatered, and removed from the process.

The ash contained in the dispersed ash slurry is comprised of very fine particles, and when suspended by the addition of dispersing agents, can be very difficult to concentrate. The very fine particle size of the ash prevents its removal from the dispersed fraction by conventional filtration means. Likewise, the ash particles may not settle during conventional gravity settling or may require extended periods of settling time. Additionally, coagulation and sedimentation using chemical or polyelectrolyte addition may not be effective or may result in formation of a gelatinous mass of solids which is essentially impossible to dewater. Other means of dewatering the dispersed ash slurry such as filtration, centrifugation or drying beds can be ineffective or uneconomical.

The present invention provides an efficient and economical method for removal and ultimate disposal of ash particles contained in a dispersed ash slurry derived from the above described process.

SUMMARY OF THE INVENTION

This is a process for separting ash particles from an aqueous ash suspension derived from a powdered adsorbent and ash particle mixture. This adsorbent/ash mixture is generated by wet air oxidation of a mixture of biological solids and spent adsorbent, produced during wastewater treatment, which regenerates the powdered adsorbent. Alternatively the spent adsorbent may be regenerated by thermal means under a controlled atmosphere followed by a water quench. The adsorbent is separated from the ash portion by treating the aqueous adsorbent/ash mixture with dilution water, dilution water and dispersants, or any other method which suspends the ash and allows the adsorbent to settle. After separating the ash suspension from the settled adsorbent, this suspension is mixed with thermally conditioned sludge which surprisingly is found to be an effective agent for settling the ash. The ratio of ash suspension to thermally conditioned sludge is preferably between 1:100 and 1:1, is more preferably between 1:9 and 1:1, and most preferably is between 1:9 and 1:3.

The settled sludge/ash mixture is separated from the clarified aqueous liquid and dewatered by any number of conventional means.

DESCRIPTION OF THE PREFERRED EMBODIMENTS

Figure 1:
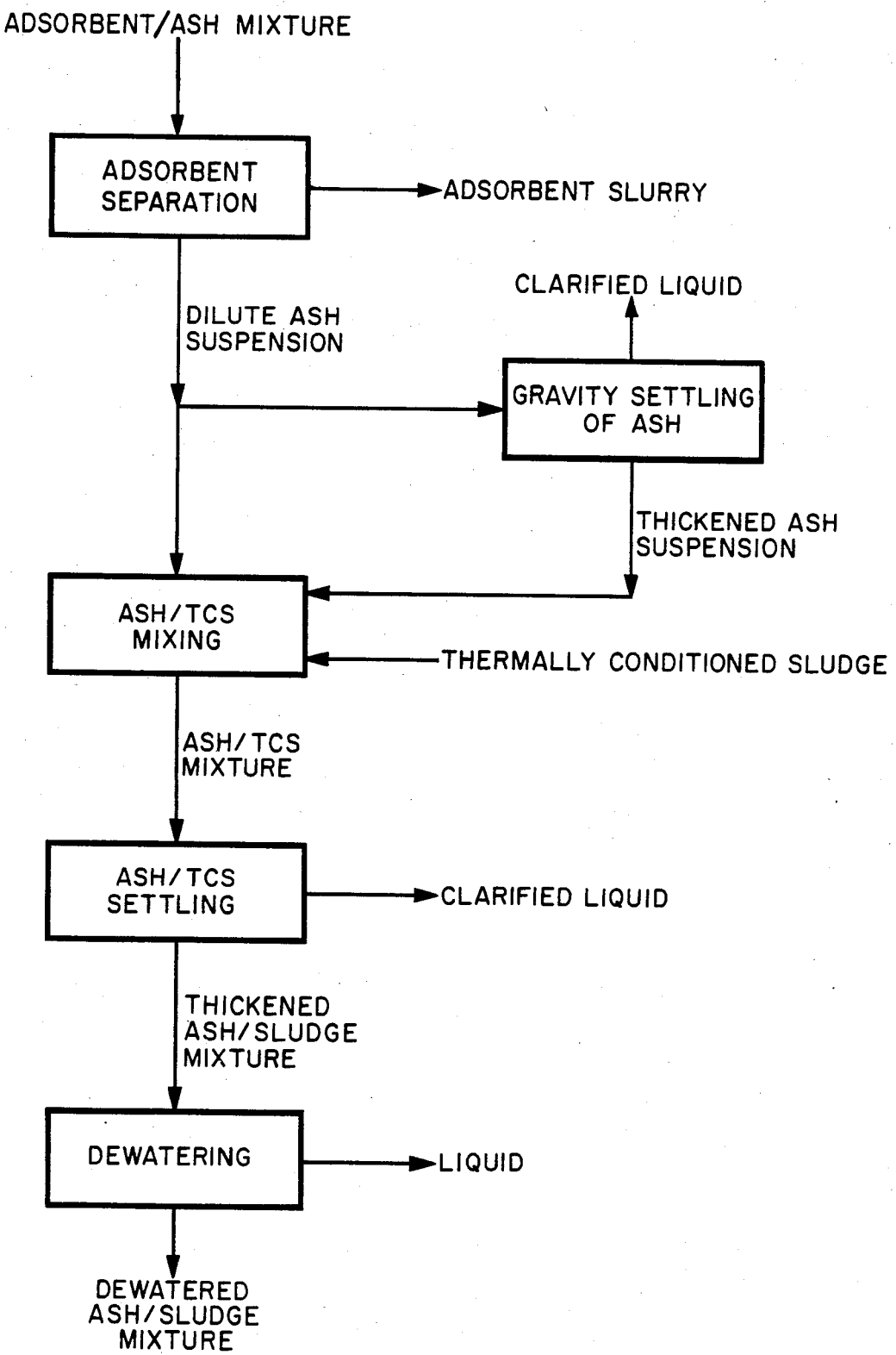
FIG. 1 is a process flowsheet showing the process steps of the present invention.

Referring to FIG. 1, a mixture of powdered adsorbent and ash particles is subjected to an adsorbent separation process, e.g. in a gravity settler. The separation process may include dilution with water, addition of dispersant(s) such as sodium hexamethaphosphate, sodium silicate, EDTA or combinations thereof, or any other process to suspended the ash. In some instances the ash particles of the adsorbent/ash mixture remain in suspension while the adsorbent particles settle out under the force of gravity alone. The settled adsorbent particles are removed as a slurry and returned to the wastewater treatment process for reuse. The dilute ash particle suspension is then treated with thermally conditioned sludge in a mixer. Thermal conditioning of the sludge can be accomplished in a conventional manner, for example, as described in Gitchel U.S. Pat. Nos. 3,272,740 and 3,359,200, those patents being hereby incorporated by reference in this description.

Alternatively, the ash suspension may be concentrated by gravity settling means to reduce the volume of ash suspension to be mixed with thermally conditioned sludge. The settler produces clarified liquid which is drawn off for further treatment, discharged to the environment, or recycled to the adsorbent separation process, and thickened ash suspension which enters the mixer. Settling of the ash particles from suspension may be a slow process and require extended periods of time. The thickened ash suspension still contains a large proportion of water. Therefore, this material is not suitable for landfill disposal, nor can it be dewatered by conventional means.

The ash/thermally conditioned sludge mixture is discharged from the mixer to an ash/sludge settler where the ash/sludge solids settle. Clarified liquid is drawn off for further treatment or discharge to the environment. The thickened ash/sludge mixture is taken to a dewatering means where additional water is removed and a dewatered ash/sludge mixture ready for final disposal is produced.

Figure 2:
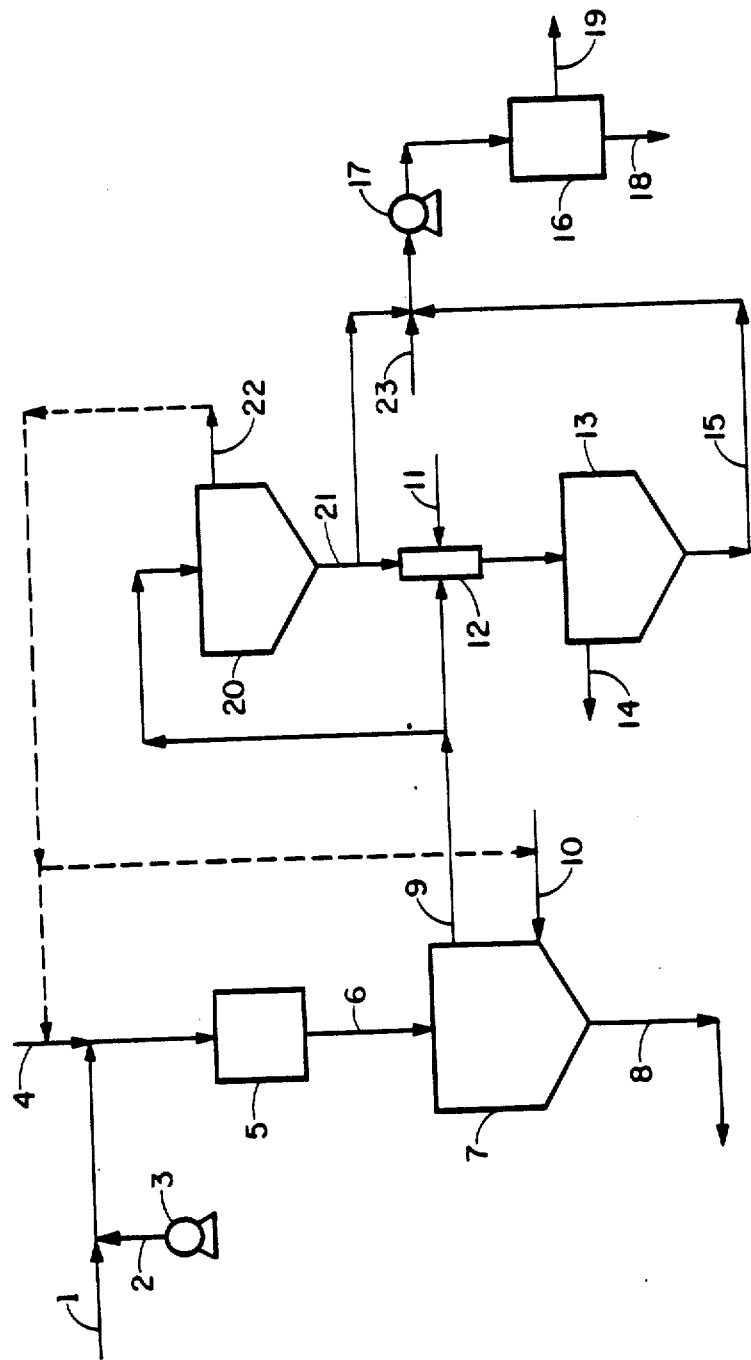
FIG. 2 is a flow diagram of a preferred embodiment of the invention.

Now turning to FIG. 2, an aqueous slurry of regenerated powdered activated carbon 1, containing a mixture of carbon and ash particles, is treated with dispersant solution 2 by means of chemical feed pump 3. The dispersant solution may contain sodium hexamethaphosphate, sodium silicate, sodium hydroxide, EDTA, or combinations thereof. The regenerated carbon slurry plus dispersant is diluted with water 4 and taken to mix tank 5 where complete mixing of water, dispersant and regenerated carbon is ensured. Slurry mixture 6 leaves mix tank 5 and enters first clarifier 7 where carbon particles quickly settle out and ash particles remain in suspension. In some instances dilution of carbon slurry 1 with water 4 alone is sufficient to bring about separation of carbon particles from ash particles. In other cases the carbon particles settle by gravity while ash particles remain suspended without any treatment. In a continuous separation process settled carbon slurry 8 is returned to the wastewater treatment process for reuse while dispersed ash fraction 9 overflows first clarifier 7 for further processing.

Alternatively the separation of carbon particles from ash may be performed in a batch mode by filling first clarifier 7 with slurry mixture 6 followed by pumping elutriation liquid 10 into the bottom of first clarifier 7. Elutriation liquid 10 generally matches the aqueous phase composition of slurry mixture 6 in order to maintain the ash particles in suspension. Ash dispersion 9 overflows first clarifier 7 for further processing. After the flow of elutriation liquid 10 ceases, the carbon particles settle to the bottom of first clarifier 7 and carbon slurry 8 is returned to the treatment process.

To concentrate and capture the ash particles, dispersion 9 is mixed with thermally conditioned sludge 11 in mixing chamber 12. The ratio of ash suspension 9 to thermally conditioned sludge 11 in mixing chamber 12 is preferable between 1:100 and 1:1. More preferably the ratio is between 1:9 and 1:1, and most preferable between 1:9 and 1:3. Chamber 12 may be nothing more than a length of pipe through which both streams flow into second clarifier 13. In this second clarifier 13, upper clarified aqueous phase 14 is drawn off for further treatment or discharge to the environment while the mixture of ash and sludge particles settles to the bottom.

Some of the advantages of this invention include the fact that most wastewater treatment plants which employ the PACT™ treatment process with ash removal also have thermal conditioning of primary sewage sludge in their plant. The thermal conditioning decant tank where sludge solids are separated from supernatant can serve as second clarifier 13. Adding ash dispersion 9 to thermally conditioned sludge 11 is often a simple procedure. Also, ash dispersion 9 is clarified without addition of coagulents beyond the already available thermally conditioned sludge 11. The liquid portion of ash dispersion 9 returns to the head of the treatment plant along with the thermally conditioned sludge supernatant.

Ash/sludge mixture 15 is pumped from second clarifier 13 to dewatering means 16 by pump 17 where additional liquid 18 is removed and dewatered ash/sludge solids 19 are produced. Dewatering means 16 can include a filter press, centrifuge, hydrocyclone, vacuum filter or other standard dewatering device. The presence of ash particles in thermally conditioned sludge was found not to affect the specific filtration resistance of the sludge even when the ash to sludge ratio was 1:1.

Alternatively ash suspension or dispersion 9 may be concentrated by gravity settling means 20 to reduce the volume of ash suspension mixed with thermally conditioned sludge 11. The settling of ash particles from suspension 9 may be a slow process and require extended periods of time. Thickened ash suspension 21 still contains a large proportion of water and is suitable neither for landfill disposal nor for dewatering by conventional means. In this alternative upper clarified aqueous phase 22 is separated and drawn off from gravity settling means 20 and lower thickened ash suspension 21 mixed with thermally conditioned sludge 11 in mixing chamber 12. The processing of the mixture of thickened ash suspension 21 and thermally conditioned sludge 11 then proceeds as described above.

In a further variation of the process thickened ash suspension 21 is mixed with previously thickened thermally conditined sludge 23 by bringing both materials through pump 17 to dewatering means 16. Liquid 18 and dewatered ash/sludge solids 19 likewise are produced by dewatering means 16.

If clarified aqueous phase 22 contains dispersing agents, this stream may be used to supplement dilution water 4 or elutriation water 10 to recycle the dispersing agents to the carbon separation process.

EXAMPLE 1

A regenerated powdered activated carbon/ash slurry was obtained from a municipal wastewater treatment plant. Wet air oxidation at 500° F. (260° C.) and 1100 psig (7585 KPa) had been used to regenerate the carbon and destroy the associated biomass. A sample of the regenerated carbon slurry was diluted with an equal volume of water and treated with a dispersant to produce a dispersed ash-containing fraction and a settled carbon fraction. The ash suspension decanted from the settled carbon contained 3.28 g/1 suspended solids at 91.8 percent ash. Portions of the ash suspension were treated with a number of chemicals and/or polymers in attempts to coagulate and concentrate the dispersed ash solids. The efficiency of these treatments was evaluated after 30 minutes. The results are shown in Table 1.

In all cases where some degree of coagulation and settling was observed, a significant portion of the ash solids still remained dispersed in solution. Solids which did coagulate and settle tended to adhere to one another forming a gelatinous mass which would be difficult to filter.

TABLE 1

| Chemical or Polymer | Polymer Type | Dosage (ppm) | Observation* |
|---|---|---|---|
| Alum | — | 100 | N |
| Ferric Chloride | — | 100 | N |
| Percol 726 | Anionic | 5 | N |
| Percol 727 | Anionic | 5 | N |
| Magnifloc 1849A | Anionic | 5 | N |
| Percol 751 | Cationic | 5 | N |
| Percol 757 | Cationic | 5 | N |
| Percol 767 | Cationic | 5 | N |
| Percol 778 | Cationic | 1 | N |
| Percol 778 | Cationic | 5 | N |
| Percol 720 | Nonionic | 1 | N |
| Percol 720 | Nonionic | 5 | SV |
| Percol 720 | Nonionic | 10 | SC |
| Percol 720 BOP 127 | Nonionic | 1 | SV |
| Percol 720 BOP 127 | Nonionic | 5 | SC |
| Alum + Percol 751 | Cationic | 100 + 1 | N |
| Alum + Percol 751 | Cationic | 100 + 5 | N |
| Alum + Percol 720 BOP 127 | Nonionic | 100 + 1 | SV |
| Alum + Percol 720 BOP 127 | Nonionic | 100 + 5 | SC |

*N = No coagulation or settling
SV = Slight coagulation and settling - very cloudy superantant
SC = Slight coagulation and settling - cloudy superanatant

EXAMPLE 2

An ash suspension obtained as in Example 1 was treated with diatomaceous earth, powdered coal (200 mesh), or thermally conditioned primary sludge. A settling test performed on the ash suspension alone demonstrated the extremely poor settling characteristics of the dispersed ash solids. A supernatant suspended solids concentration of 2.18 g/1 was obtained after one hour settling compared to 3.28 g/1 suspended solids in the starting ash suspension. Total suspended solids of thermally conditioned sludge generally range from 10 g/1 to 70 g/1. The sludge used in this example contained approximately 40 g/1 total suspended solids. The thermally conditioned sludge gave a suspended solids concentration of 0.198 g/1 after one hour settling. Tests with diatomaceous earth or powdered coal resulted in these additives quickly settling out of the ash suspension with no apparent settling of the dispersed ash particles.

Results from settling tests obtained by mixing various proportions of thermally conditioned sludge and ash suspension are given in Table 2. The volumetric ratio of thermally conditioned sludge to ash suspension was varied from 9:1 to 1:1. Measured supernatant suspended solids concentration for these mixtures after one hour settling is shown in Column C as well as those obtained for sludge or ash dispension alone. The concentration of suspended solids in the mixture from sludge or ash, Column A or B, respectively, is simply the total suspended solids value of each component multiplied by the volumetric fraction of that component in the mixture.

TABLE 2

Calculated Removal of Ash Suspended Solids by the Addition of Thermally Conditioned Sludge

| Sludge/Ash | Solids in Mixture | | Actual Supernat. S.S. g/1 | Supernatant Solids From: | | Percent Removal of Ash Solids |
|---|---|---|---|---|---|---|
| | Sludge g/1 | Ash g/1 | | Sludge g/1 | Ash g/1 | |
| X/Y | A | B | C | D | E | F |
| 100/0 | 40 | 0 | 0.198 | 0.198 | 0 | — |
| 90/10 | 36 | 0.328 | 0.226 | 0.178 | 0.048 | 85.4 |
| 75/25 | 30 | 0.82 | 0.274 | 0.149 | 0.125 | 84.8 |
| 67/33 | 26.8 | 1.093 | 0.384 | 0.132 | 0.252 | 76.9 |
| 50/50 | 20 | 1.64 | 0.462 | 0.099 | 0.363 | 77.9 |
| 0/100 | 0 | 3.28 | 2.18 | 0 | 2.18 | 33.5 |

A = 40 g/1 (given sludge solids) × X/100
B = 3.28 g/1 (given ash solids) × Y/100
D = 0.198 g/1 × X/100
E = C − D
F = 100 − (E/B × 100)

The portion of supernatant suspended solids in the mixtures attributed to sludge (Column D) is the suspended solids value of sludge alone (0.198 g/1) multiplied by the volumetric fraction of sludge in the mixture. This is based on the assumption that when thermally conditioned sludge is diluted, the resulting supernatant suspended solids concentration is diluted proportionately. The portion of the supernatant suspended solids in the mixtures attributed to ash (Column E) therefore is the difference between measured supernatant suspended solids (Column C) and the portion attributed to sludge suspended solids (Column D). For the mixtures the percent of ash solids remaining in suspension is E/B×100 and the percent ash removal (Column F) is 100−(E/B×100). Ash removal increased from 33.5% with no sludge added to 77% to 85% removal for the mixtures.

With the thermally conditioned sludge tests, complete settling of the ash and sludge solids was observed demonstrating that thermally conditioned sludge is an extremely effective settling agent for the dispersed ash solids. Further, the addition of dispersed ash to the thermally conditioned sludge did not hinder settling velocities of the sludge and only slight increases in supernatant suspended solids concentrations were observed as the ratio of dispersed ash to thermally conditioned sludge was increased.

EXAMPLE 3

To determine the effect of ash content on filterability of thermally conditioned sludge, specific filtration resistance (SFR) tests were performed on the dispersed ash, thermally conditioned sludge, and dispersed ash/thermally conditioned sludge mixtures generated in Example 2. The SFR test is an indicator of dewaterability of an aqueous material. An SFR value of less than $40 \times 10^7$ $\sec^2/g$ generally indicates an easily dewaterable material. Results of the SFR testing are shown in Table 3. These results show the dispersed ash alone to be extremely difficult to dewater using conventional methods. However, when mixed with thermally conditioned sludge solids, the ash is easily dewatered and exhibits dewatering characteristics similar to thermally conditioned sludge alone.

TABLE 3

| Thermally Conditioned Sludge, Volume Percent | Ash Slurry Volume Percent | SFR, $10^7 \sec^2/g$ |
|---|---|---|
| 100 | 0 | 9.9 |
| 90 | 10 | 4.9 |
| 75 | 25 | 7.9 |
| 67 | 33 | 8.6 |
| 50 | 50 | 6.7 |
| 0 | 100 | 980. |

Finally, the results of the above testing demonstrate the dispersed ash fraction generated from carbon recovery and ash separation of a regenerated carbon stream has extremely poor settling and dewatering characteristics. The solids contained in the dispersed ash fraction are difficult to coagulate and concentrate using conventional methods such as chemical or polymer addition. However, when mixed with thermally conditioned sludge solids, the ash solids can be readily concentrated along with the thermally conditioned sludge solids and this mixture easily dewatered using conventional solids dewatering devices.

We claim:

1. a process for separating ash particles from an aqueous ash suspension which has been separated from an aqueous mixture of adsorbent and ash particles comprising the steps of:
   a. mixing said ash suspension with a sufficient amount of a thermally conditioned sludge to produce a settleable mixture of sludge and ash particles;
   b. allowing said ash/sludge mixture to settle to produce a settled solids phase and a clarified aqueous phase; and
   c. separating said settled solids phase from said clarified aqueous phase.

2. The process according to claim 1 further comprising the steps of:
   d. discharging said clarified aqueous phase to further treatment or to the environment; and
   e. disposing said separated settled solids phase.

3. The process according to claim 2 wherein said separated settled solids phase is dewatered prior to disposal.

4. The process according to claim 3 wherein said solids phase is dewatered with a filter press.

5. The process according to claim 3 wherein said solids phase is dewatered with a centrifuge.

6. The process according to claim 3 wherein said solids phase is dewatered with a liquid cyclone.

7. The process according to claim 3 wherein said solids phase is dewatered with a vacuum filter.

8. The process according to claim 1 wherein the volumetric ratio of said ash suspension to said thermally conditioned sludge in step (a) is from 1:100 to 1:1.

9. The process according to claim 8 wherein the volumetric ratio of said ash suspension to said thermally conditioned sludge in step (a) is from 1:9 to 1:21.

10. The process according to claim 8 wherein the volumetric ratio of said ash suspension to said thermally conditioned sludge in step (a) is from 1:9 to 1:3.

11. The process according to claim 1 wherein said ash suspension is concentrated prior to mixing with said thermally conditioned sludge in step (a).

12. The process according to claim 1 wherein said ash suspension is separated from an aqueous mixture of carbon and ash particles recovered from a wastewater treatment system and subjected to wet air oxidation.

13. The process according to claim 1 wherein said ash suspension is separated from an aqueous mixture of carbon and ash particles recovered from a wastewater treatment system and subjected to thermal regeneration.

14. A process for separating ash particles from an aqueous ash suspension which has been separated from an aqueous mixture of adsorbent and ash particles comprising the steps of:
   a. concentrating said aqueous ash suspension to produce a thickened ash suspension and a clarified aqueous phase;
   b. separating said thickened ash suspension from said clarified aqueous phase;
   c. concentrating a thermally conditioned sludge to produce a thickened thermally conditioned sludge;
   d. mixing said thickened ash suspension and said thickened thermally conditioned sludge to produce an ash/sludge mixture;
   e. dewatering said ash/sludge mixture; and
   f. disposing said dewatered ash/sludge mixture.

15. The process according to claim 14 wherein said separated clarified aqueous phase from step (b) is recycled to an adsorbent separation process.

16. The process according to claim 14 wherein said ash/sludge mixture is dewatered with a filter press.

17. The process according to claim 14 wherein said ash/sludge mixture is dewatered with a centrifuge.

18. The process according to claim 14 wherein said ash/sludge mixture is dewatered with a liquid cyclone.

19. The process according to claim 14 wherein said ash/sludge mixture is dewatered with a vacuum filter.

20. The process according to claim 14 wherein said ash suspension is separated from an aqueous mixture of carbon and ash particles recovered from a wastewater treatment system and subjected to wet air oxidation.

21. The process according to claim 14 wherein said ash suspension is separated from an aqueous mixture of carbon and ash particles recovered from a wastewater treatment system and subjected to thermal regeneration.

* * * * *

UNITED STATES PATENT AND TRADEMARK OFFICE
CERTIFICATE OF CORRECTION

PATENT NO. : 4,735,729 Page 1 of 2
DATED : April 5, 1988
INVENTOR(S) : Marvin J. Dietrich, Mark C. Hoffmann, Thomas P. Oettinger It is certified that error appears in the above-identified patent and that said Letters Patent is hereby corrected as shown below:

Front page, under "References Cited," "3,977,966 8/1976 Prodt et al", should read --3,977,966 8/1976 Pradt et al--

Front page, after the Abstract, "21 Claims, 1 Drawing Sheet" should read --21 Claims, 2 Drawing Sheets--.

Add the second sheet of drawings showing Figure 2.

Column 1, line 18, "(PACT$^{198}$" should be --(PACT$^{TM}$--

Column 8, line 8, "1:21" should be --1:1--.

On The Title Page, "21 Claims, 1 Drawing Sheet" should read -- 21 Claims, 2 Drawing Figures --.

Signed and Sealed this

Sixteenth Day of August, 1988

Attest:

DONALD J. QUIGG

Attesting Officer     Commissioner of Patents and Trademarks